(12) United States Patent
Massel

(10) Patent No.: US 6,474,195 B2
(45) Date of Patent: Nov. 5, 2002

(54) TORQUE CONVERTER DRIVE AND COUNTERSHAFT TRANSMISSION DRIVE COMBINATION

(75) Inventor: Bruno H. Massel, Bensenville, IL (US)

(73) Assignee: Bruno's Automotive Products, Inc., Addison, IL (US)

( * ) Notice: Subject to any disclaimer, the term of this patent is extended or adjusted under 35 U.S.C. 154(b) by 0 days.

(21) Appl. No.: 10/041,297

(22) Filed: Jan. 8, 2002

(65) Prior Publication Data
US 2002/0056341 A1 May 16, 2002

Related U.S. Application Data

(63) Continuation of application No. 09/542,176, filed on Apr. 4, 2000, now Pat. No. 6,336,379.
(60) Provisional application No. 60/127,691, filed on Apr. 5, 1999.

(51) Int. Cl.[7] .............................................. F16H 47/00
(52) U.S. Cl. .................................................... 74/730.1
(58) Field of Search ........................................ 74/730.1

(56) References Cited

U.S. PATENT DOCUMENTS

| | | | |
|---|---|---|---|
| 3,099,166 A | 7/1963 | Schou | 74/359 |
| 3,425,293 A | 2/1969 | Krawczyk et al. | 74/360 |
| 3,465,609 A | 9/1969 | Fisher et al. | 74/360 |
| 4,392,391 A | 7/1983 | Jameson et al. | 74/333 |
| 4,635,495 A | 1/1987 | White | 74/364 |
| 4,793,213 A | 12/1988 | Nishimura | 74/730 |
| 4,864,881 A | 9/1989 | Beeson et al. | 74/360 |
| 4,934,207 A | 6/1990 | Ishikawa et al. | 74/364 |
| 4,974,473 A | 12/1990 | Hatakeyama | 74/730.1 |
| 5,050,716 A | 9/1991 | Christensen | 192/3.23 |
| 5,090,528 A | 2/1992 | Massel | 192/3.34 |
| 5,918,509 A | 7/1999 | Heilig et al. | 74/730.1 |
| 6,336,379 B1 | 1/2002 | Massel | 74/730.1 |

OTHER PUBLICATIONS

Excerpts from SAE Handbook, vol. 4, pp. 29.01–29.04, 29.07–29.10, "On–Highway Vehicles and Off–Highway Machinery", 1998.

*Primary Examiner*—Dirk Wright
(74) *Attorney, Agent, or Firm*—McAndrews, Held & Malloy, Ltd.

(57) ABSTRACT

A drive combination that is disclosed that is particularly suited for use in automobiles constructed to engage in acceleration racing. The drive combination includes a torque converter drive unit that is driven by an engine, and a countershaft transmission that that is driven by the torque converter drive unit. The disclosed drive combination requires less power to drive than known torque converter drive and planetary gear transmission drive combinations used for automobile racing and is lighter than such known drive combinations.

7 Claims, 1 Drawing Sheet

TORQUE CONVERTER DRIVE AND COUNTERSHAFT TRANSMISSION DRIVE COMBINATION

CROSS REFERENCE TO RELATED APPLICATIONS

This application claims the priority of provisional application Serial No. 60/127,691, filed Apr. 5, 1999, and is a continuation of application Ser. No. 09/542,176 filed Apr. 4, 2000, now U.S. Pat. No. 6,336,379. These applications are hereby incorporated herein by reference.

STATEMENT REGARDING FEDERALLY SPONSORED RESEARCH OR DEVELOPMENT

Not applicable.

BACKGROUND OF THE INVENTION

Power is conventionally transmitted from the engine of an automobile or a truck through one of two conventional combinations of power transmission devices. One combination is a mechanically operated friction clutch and a manually shifted countershaft transmission. The other combination is a hydrodynamic drive, typically a torque converter, and an automatically shifted planetary gear transmission.

The clutch and manually shifted countershaft transmission combination includes a friction clutch that is mounted to a flywheel on the vehicle's engine. An input shaft of the countershaft transmission engages and is driven by a driven component of the clutch, conventionally a disk that frictionally engages the flywheel. Countershaft transmissions have meshing gears mounted on parallel shafts. The speed ratio and torque ratio provided by the transmission depends on the ratios of the meshing pairs of gears through which power is transmitted from the input shaft of the transmission to the output shaft. A countershaft transmission is conventionally either a sliding gear transmission or a constant mesh transmission. In a sliding gear transmission, gears are moved along a shaft into or out of engagement with another gear to change the path through which power is transmitted through the transmission and thereby changes the transmission ratios. In a constant mesh transmission, gears are constantly in mesh and positive engagement or friction devices couple the gears to a shaft of the transmission. In either type of transmission, ratios are changed by operation of a shifter mechanism that moves gears in the case of a sliding gear transmission or operates friction or positive engagement devices in the case of a constant mesh transmission.

The hydrodynamic drive and automatically shifted planetary gear transmission combination is driven by a torque converter mounted to a flywheel on an engine. An input shaft of a planetary gear transmission engages and is driven by the torque converter. The planetary gear transmission conventionally has planetary gear assemblies aligned along the axis of the input shaft. Power is transmitted through the planetary gear assemblies by fixing one of the three components of the assembly, the sun gear, the plane gear carrier, or the ring gear, against rotation and applying power to one of the other two components to drive the remaining component. The drive ratio of the transmission is determined by the diameters of the gears of the planetary gear assemblies through which power is transmitted. The path through which power is transmitted through planetary gear assemblies is changed by hydraulically operated devices. A hydraulically operated brake having a band that is mounted to the transmission case and surrounds the ring gear of a planetary gear assembly is conventionally used to secure the ring gear to the transmission case. When the ring gear is secured to the transmission case, power may be transmitted through the sun and planet gear carrier of the planetary gear assembly. Hydraulically operated clutch pack assemblies having adjacent disks that alternately engage a surrounding case and an inner splined shaft are used to selectively couple and uncouple the shaft to the case by applying or removing a hydraulic pressure to the assembly. Hydraulically operated frictional engagement devices, brake bands and clutch packs, provide control of the performance of the transmission. Frictional engagement devices that engage and disengage to change the ratio of planetary gear transmissions can provide a high level of mechanical reliability. Because those devices are actuated by hydraulic pressure, planetary gear transmissions are conventionally shifted automatically by controlled application of hydraulic pressure to frictional engagement devices in the transmission.

These conventional power transmitting combinations have been the bases from which power transmitting combinations and devices have been specifically designed and constructed for use in racing. Racing that primarily requires acceleration, in particular, requires transmissions that are more durable and that must satisfy different requirements than do conventional automotive transmissions. In acceleration racing, such as drag racing, either the maximum available power or the maximum power that can be used to accelerate the car is transmitted through the driveline of the racecar throughout the race. The transmission must provide a high degree of mechanical reliability both in changing gear ratios and in structural reliability. Failure to quickly change gears and failure of a component of the transmission are both causes of lost races.

Cars having the most powerful engines used in drag racing have long required transmissions specifically constructed to transmit the large power created by their engines. Specially constructed planetary gear transmissions that have large and high strength gears and other components have been used in various forms of racing, including drag racing for many years. These transmissions, manufactured by Lenco, Inc. and others, have used high strength planetary gear assemblies with mechanically operated friction engagement devices to provide both reliable changes of transmission ratios and structural reliability.

The most powerful cars for which planetary gear transmissions were specially constructed have conventionally driven these transmissions by clutches that are constructed to provide a significant amount of control of the rate at which the high power generated by the engines of these cars is applied to the driveline of the racecar. The planetary gear transmissions specially constructed for racing and used in the most powerful racecars are coupled to the engine differently than planetary gear transmissions used in conventional automotive applications in that they have been driven by clutches and have conventionally been shifted by mechanically or pneumatically, rather than hydraulically, actuated mechanisms.

While racing planetary gear transmissions provide mechanically reliable gear ratio changes and structural reliability, that reliability comes at the price of requiring power to drive the large and heavy components of the transmission. A significant amount of power is required to drive heavy components of racing planetary gear transmissions. The power required to drive racing planetary gear transmissions is not a significant disadvantage to racecars having the highest power engines. However, the power required to drive these transmissions is a significant disadvantage to racecars that are limited to engines that do not produce more power than the racecar can utilize to increase performance. For such cars, decreasing the power consumed by driving components of the car increases the power that can be used to drive the car and to thereby increase performance.

Countershaft racing transmissions that require less power to drive than racing planetary gear transmissions have recently been developed. In addition to requiring less power to drive than planetary gear racing transmissions, racing countershaft transmissions are lighter than planetary gear racing transmissions. These countershaft racing transmissions are generally constant mesh transmissions having mechanical engagement devices, such as positive jaw clutches, that mechanically couple and uncouple components of the transmission to change the torque drive path through the transmission. These transmissions are sometimes referred to a "clutchless" transmissions because they do not use clutch packs that are used by planetary gear transmissions to change gear ratios. Countershaft transmissions have been used in racecars that have engines that, while producing significant power, do not produce more power than can be used to drive the racecar. A primary objective for equipment used in the driveline of such cars, including transmissions, is to consume as little power as possible and thereby make as much power as possible available to drive the racecar. These transmissions have been developed for and are used by racecars that use clutches to obtain significant control over the application of power to the transmission and to avoid loss of power typically required to drive a torque converter. While these clutches and countershaft transmissions differ considerably in design and construction from clutches and transmissions used in conventional automotive applications, they nevertheless comprise a conventional combination of a friction clutch and countershaft transmission.

Racecars that do not have engines that create very high power have used, and continue to use, torque converter driven modified planetary gear transmissions that were originally constructed for conventional automotive applications. The engines used by many such cars have become sufficiently powerful that modified conventional transmissions fail unacceptably frequently. Recently, devices have been developed to drive a planetary gear racing transmission by a torque converter. Those devices are driven by a torque converter, have a brake mechanism to selectively and reliably withhold and apply power to the transmission, and have been developed specifically for use with racing planetary gear transmissions. One such device is disclosed by U.S. Pat. No. 5,090,528, which is incorporated herein by reference and is assigned to the assignee of the invention that is the subject of this application. Another such device is disclosed by U.S. Pat. No. 5,050,716. These devices, in combination with racing planetary gear transmissions, more nearly resemble the conventional combination of a torque converter and planetary gear transmission than does the combination of a clutch and planetary gear transmission.

The combination of a torque converter drive and a planetary gear racing transmission provides a reliable and durable driveline combination. However, many racecars that use that combination do not use engines that produce the highest power and therefor do not require transmissions having components as large and strong as those of racing planetary gear transmissions. In addition, even racecars for which total weight is not a critical consideration, the weight of planetary gear racing transmissions is a disadvantage because the significant weight of the transmission is at a fixed location in the racecar and thereby limits the amount of weight that can be distributed to increase performance and handling of the racecar. Further, because of the size and durability of their components, racing planetary gear transmissions are significantly expensive components of a racecar.

The need therefor exists for a driveline combination that includes a torque converter drive and a transmission that is lighter and less expensive than combinations that include a racing planetary gear transmission and that is durable and reliable. The need also exists for such a combination further including a driveline brake that can be closely controlled to reliably apply power from the racecar engine to the driveline.

SUMMARY OF THE INVENTION

In accordance with the present invention, the disadvantages of the driveline combination of a torque converter drive and a racing planetary gear transmission have been overcome. A combination is provided in which a torque converter drives a countershaft transmission. A releasable driveline brake may further be included in the combination to selectively withhold and then release power to the driveline of a racecar having the combination of this invention.

More particularly, the preferred combination of the present invention includes a torque converter to driveline coupler. That coupler includes a fluid pump adapted to provide fluid under pressure to a torque converter mounted to a flywheel that is mounted to an engine. The combination also includes a countershaft transmission. The coupler is adapted to engage an input shaft of the transmission and to drive the input shaft of the transmission from the torque converter. The countershaft transmission is preferably a constant mesh transmission.

Additionally, the torque converter to driveline coupler may include a fast-release brake that can prevent the coupler from driving the countershaft transmission when the engine is driving the torque converter.

Accordingly, an object of the present invention is to drive a countershaft transmission by a torque converter.

Another object of the present invention is to provide a combination of power transmission devices that is driven by a torque converter, allows manual changing of transmission ratios, and that consumes less power than previous torque converter drive and racing planetary gear transmission combinations.

Yet another object of the present invention is to provide a combination of power transmission components that is durable enough to withstand racing driveline loads and is less expensive than prior torque converter driven combinations.

These and other objects and advantages of the present invention, as well as details of the preferred embodiment thereof, will be more fully understood from the drawings and the following description.

DESCRIPTION OF THE PREFERRED EMBODIMENT

Figure 1:
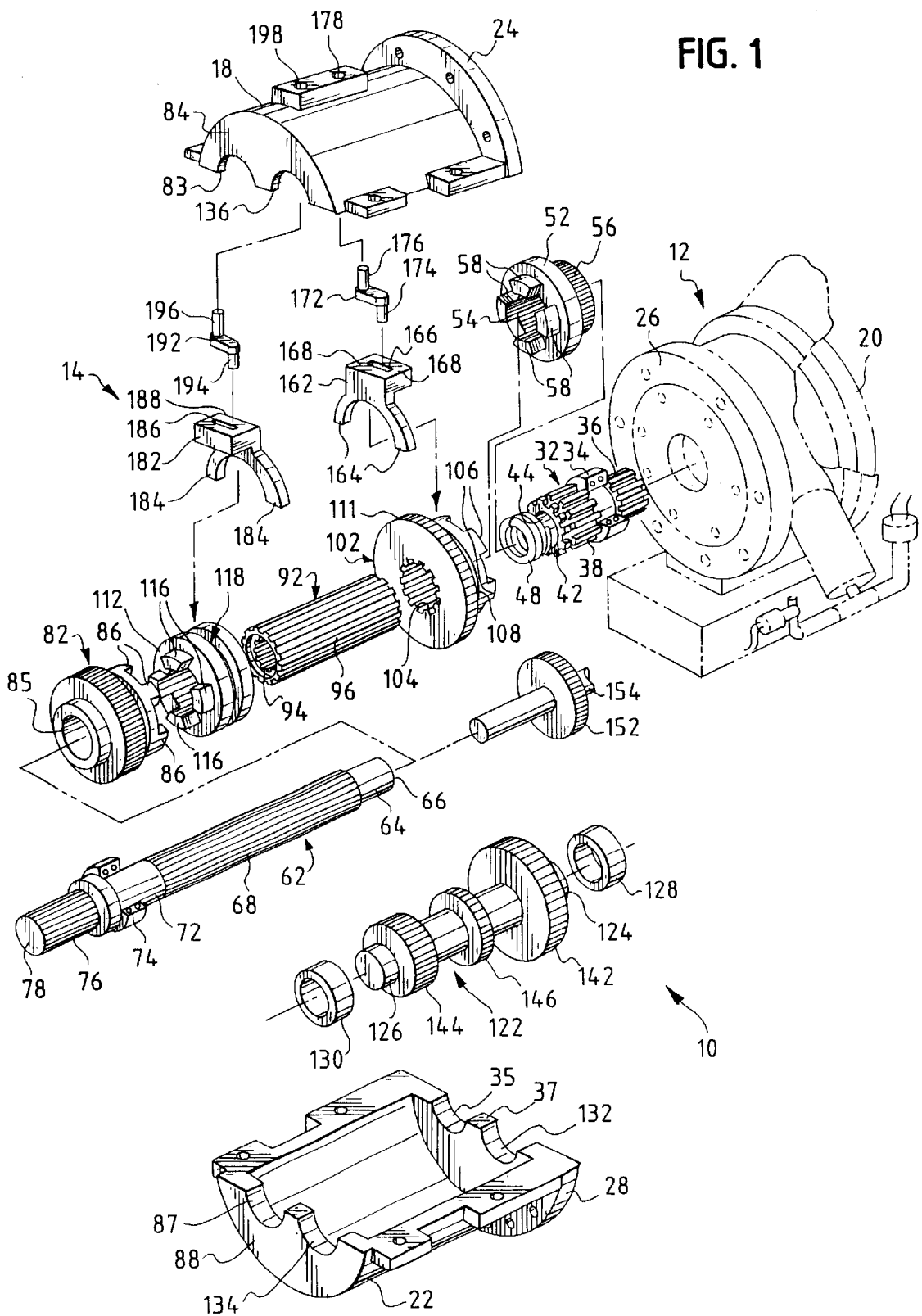
FIG. 1 is an exploded view of a combination of a countershaft transmission and a torque converter to driveline coupler according to the present invention.

As illustrated by FIG. 1, drive combination 10 includes a torque converter to driveline coupler 12 and a countershaft transmission 14. The torque converter to driveline coupler 12 is driven by a torque converter 20 that is mounted to a flywheel (not shown) that is mounted to a crankshaft of an engine (not shown). The torque converter to driveline coupler 12 has a transmission flange 26 defining a surface at an end of the torque converter to driveline coupler 12 opposite the torque converter. The transmission flange 26 is constructed to mate to a mounting flange of a transmission. The torque converter to driveline coupler 12 is preferably as described by U.S. Pat. No. 5,090,528. The construction and operation of the torque converter to driveline coupler 12 is described in that United States patent, which has been incorporated by reference, and will not again be described.

The countershaft transmission 14 is preferably a transmission manufacture by Long Machine and Tool of Annville, Pa. The countershaft transmission 14 is depicted by FIG. 1 is a two speed transmission including a reverse gear. FIG. 1 includes an exploded view of countershaft transmission 14 that illustrates components essential to characterize the combination of the present invention.

The countershaft transmission 14 includes an upper case 18 and a lower case 22 that are joined together to form an enclosing case for the transmission. The upper case 18 includes a flange 24 and the lower case 22 includes a flange 28. When upper case 18 and lower case 22 are joined, flanges 24 and 28 are positioned together to mate to transmission flange 26 of torque converter to driveline coupler 12. As used herein to describe components of the countershaft transmission 14, forwardly refers to a direction toward the torque converter to driveline coupler 12, and rearwardly refers to an opposite direction.

Countershaft transmission 14 includes an input shaft 32. An input bearing 34 is mounted to the input shaft 32. A seat 35 is formed in a surface of a front wall 37 of the lower case 22 that meets a front surface (not shown) of the upper case 18 that is bounded by the flange 24. A seat (not shown) in a front wall (not shown) of the upper case 18 is positioned opposite the seat 35. The seat 35 and the seat in the front wall of the upper case 18 secure the input bearing 34 to the transmission case. The input shaft 32 has an input spline 36 extending towards the torque converter to driveline coupler 12 from the input bearing 34. The input spline 36 extends forwardly from the countershaft transmission 14 to engage and be driven by the torque converter to driveline coupler 12. The input spline 36 may engage and be driven by a component of the torque converter to driveline coupler 12, such as the brake drum identified by U.S. Pat. No. 5,090,528 as 82. Alternatively, the input shaft 32 may extend through the torque converter to driveline coupler 12 to engage and be driven by the torque converter 20. In that case, the input shaft also engages and drives components, including a brake, of the torque converter to driveline coupler 12.

The input shaft 32 has a first gear mounting spline 38 extending rearwardly into the transmission 14 to an inner end 42. A bore 44 extends into the input shaft 32 from the inner end 42. A pilot bearing 48 is positioned within the bore 44. An input drive gear 52 has an internally splined bore 54 that is sized to engage the mounting spline 38. Input drive gear 52 includes gear section 56 forming a gear for power transmission that is adjacent to bearing 34. Jaws 58 extend rearwardly from the input drive gear 52.

Main shaft 62 has a pilot section 64 adjacent to a forward end 66. Pilot section 64 is sized to be positioned within the pilot bearing 48 aligning the main shaft 62 with the input shaft 32. A spline 68 extends rearwardly along main shaft 62 from pilot section 64. The main shaft 62 defines a journal 72 rearwardly adjacent the spline 68. A bearing 74 is mounted to the main shaft 62 rearwardly adjacent to the journal 72. An output spline 76 extends along the main shaft 62 rearwardly from the bearing 74 to a rear end 78 of the main shaft 62. The bearing 74 is received in seat 83 of the rear wall 84 of the upper case 18 and in seat 87 in the rear wall 88 of the lower case 22. The output spline 76 extends rearwardly from the countershaft transmission case to drive a driveline component, such as a driveshaft (not shown).

A first gear 82 has a bore 85 sized to be positioned around the journal 72 of the main shaft 62. The first gear 82 includes jaws 86 that extend along the main shaft 62 forwardly from the first gear 82.

Slider sleeve 92 has an internally splined bore 94 sized to engage the spline 68 of the main shaft 62. The slider sleeve 92 is thereby rotationally affixed to the main shaft 62. The slider sleeve 92 has an external spline 96 extending along its length.

A high gear slider 102 has a bore 104 that is internally splined to slidably engage the external spline 96 of the slider sleeve 92. The high gear slider 102 is thereby rotationally affixed to the slider sleeve 92 and through the slider sleeve 92 to the main shaft 62. The high gear slider 102 includes jaws 106 that extend forwardly from high gear slider 102. Jaws 106 are sized and constructed to positively engage the jaws 58 of the input drive gear 52 when the high gear slider 102 is advanced toward input drive gear 52. A shifter groove 108 extends radially into high gear slider 102 around a circumference of the high gear slider 102 at a location rearward of the jaws 106. The high gear slider 102 forms reverse gear 111 rearwardly adjacent to the shifter groove 108.

A first gear slider 112 has a bore 114 that is internally splined to slidably engage the external spline 96 of the slider sleeve 92. The first gear slider 112, is thereby rotationally affixed to the slider sleeve 92 and through the slider sleeve 92 to the main shaft 62. The first gear slider 112 includes jaws 116 that extend rearwardly from the first gear slider 112. The jaws 116 are sized and constructed to positively engage the jaws 86 of the first gear 82 when the first gear slider 112 is moved rearwardly toward first gear 82. A shifter groove 118 extends radially into first gear slider 112 around a circumference at a location forward of the jaws 116.

A countershaft assembly 122 is positioned within the countershaft transmission case parallel to the input shaft 32 and the main shaft 62. The countershaft assembly 122 has a front journal 124 at the forward extent of the countershaft assembly 122 and a rear journal 126 at the rearward extent of the countershaft assembly 122. A front bearing 128 receives the front journal 124 and a rear bearing 130 receives the rear journal 126. The front bearing 128 is received by a seat 132 in a surface of the front wall 37 of the lower case 22 that meets a front surface (not shown) of the upper case 18 that is bounded by the flange 24. The front bearing 128 is also received in a seat (not shown) in the front wall (not shown) of the upper case 18 that is bounded by the flange 24. The rear bearing 130 is received in a seat 134 formed in a surface of the rear wall 88 of the lower case 22 that meets the rear wall 84 of the upper case 18. The rear bearing 130 is also received in a seat 136 formed in a surface of the rear wall 84 of the upper case 18 that meets the rear wall 88 of the lower case 22.

The countershaft assembly 122 includes an input drive gear 142 that is rearwardly adjacent to the front journal 124. The input drive gear 142 is positioned to mesh with and be driven by the input gear section 56. The countershaft assembly 122 also includes a first drive gear 144 positioned forwardly adjacent to the rear journal 126. The first drive gear 144 is positioned to mesh with and transmit power to the first gear 82. The counter shaft assembly 122 further includes a reverse drive gear 146 that is positioned intermediate the input drive gear 142 and the first drive gear 144.

A reverse idler gear 152 is rotatably mounted with an idler shaft 154 that is mounted within upper case 18 and positioned parallel to the main shaft 62 and the countershaft assembly 22. The reverse idler gear is positioned to mesh with and be driven by the reverse drive gear 146 of the countershaft assembly 122. The reverse idler gear is positioned rearward of the position of the high gear slider 102 at which the jaws 106 of the high gear slider 102 engage the jaws 58 of the input drive gear 52.

A high gear fork 162 having arms 164 is positioned within the upper case 18 so that the arms 164 extend into the shifter groove 108 of the high gear slider 102. A groove 166 extending generally perpendicular to the main shaft 62 is formed in an upper surface 168 of the high gear fork 102 that faces toward the upper case 18. A high gear shifter arm 172 is positioned adjacent to the upper surface 168. The shifter arm 172 has a journal 174 that extends into the groove 166. The shifter arm 172 has a journal 176 that is parallel to the journal 174 and extends oppositely from the journal 174. The journal 176 is offset a distance from the journal 174 in a direction that is generally perpendicular to the main shaft 62. The journal 176 extends through a bore 178 in the upper case 18. The portion of the journal 176 extending through the upper case 18 may be engaged by a shifter (not shown) to rotate the shifter arm 172 about the journal 176 thereby moving the journal 174, the shifter fork 162, and the high gear slider 102 along the slider sleeve 92.

A first gear fork 182 having arms 184 is positioned within the upper case 18 so that the arms 184 extend into the shifter groove 118 of the first gear slider 112. A groove 186 extending generally perpendicular to the main shaft 62 is formed in an upper surface 188 of the first gear fork 182 that faces toward the upper case 18. A first gear shifter arm 192 is positioned adjacent to the upper surface 188. The shifter arm 192 has a journal 194 that extends into the groove 186. The shifter arm 192 has a journal 196 that is parallel to the journal 194 and extends oppositely from the journal 194. The journal 196 is offset a distance from the journal 194 in a direction that is generally perpendicular to the main shaft 62. The journal 196 extends through a bore 198 in the upper case 18. The portion of the journal 196 extending through the upper case 18 may be engaged by a shifter (not shown) to rotate the shifter arm 192 about the journal 196 thereby moving the journal 194, the shifter fork 182, and the first gear slider 112 along the slider sleeve 92.

Power is applied to the input shaft 32 by the torque converter to drive coupler 12. The input drive gear 52 is driven by the input shaft 32. The input drive gear 142 of the countershaft assembly 122 engages and is driven by the input drive gear 52. The reverse idler gear 152 is driven by the reverse drive gear 146 of the countershaft assembly 122. The first gear 82 is driven by the first drive gear 144.

The main shaft 62 is driven only by the high gear slider 102 and the first gear slider 112. The transmission ratio of the countershaft transmission 14 depends on the positions of the high gear slider 102 and the first gear slider 112.

When the high gear slider 102 is moved toward the input gear 52 to the position at which the jaws 106 of the high gear slider 102 engage the jaws 58 of the input drive gear 52, the main shaft is driven by the high gear slider 102 and rotates at the same speed as the input shaft 32. When the high gear slider is moved rearwardly from the input drive gear 52 to a position at which the reverse gear 111 engages the reverse idler gear 152, the main shaft 62 is rotated oppositely of the input shaft at a speed that results from the ratios of the input drive gear section 56 and the input drive gear 42, the reverse drive gear 146 and the reverse gear 111. When the high gear slider 102 is at a position between the input gear 52 and the reverse idler gear 152, the high gear slider rotates with the main shaft 62 and does not drive the main shaft 62.

When the first gear slider 112 is moved forwardly away from the first gear 82, the first gear 82 freely rotates about the main shaft 62. When the first gear slider 112 is move rearwardly to a position at which the jaws 116 of the first gear slider engage the jaws 86 of the first gear 82, the first gear slider 112 rotates with the first gear 82. The main shaft 62 is driven at a speed that depends on the ratio of the input drive gear section 56 and the input drive gear 142 and the ratio of the first drive gear 144 and the first gear 82.

As will be appreciated by those of skill in the art, the present invention is not limited to the described embodiment. Modifications and variations of the present invention are possible in light of the teachings of this invention including, for example, use of a countershaft transmission having three or more forward gears. It should be understood that, within the scope of the appended claims, the invention may be practiced other than as described above.

What is claimed is:

1. A drive combination comprising:
   a torque converter to driveline coupler adpated to be driven by a torque converter and to
   drive a transmission, the torque converter to driveline coupler having
      a coupler shaft constructed to engage and be driven by the torque converter, and
      a fluid pump that engages and is driven by the torque converter when the torque
      converter engages the coupler shaft and that supplies fluid under pressure to the
      torque converter, and
   a countershaft transmission having a clutchless power path including
      a first gear mounted on a first shaft to rotate with the first shaft,
      a second gear and a third gear mounted on a second shaft so that the second gear
      and the third gear rotate with the second shaft, the second gear meshing with the
      first gear; and
      a fourth gear rotatably mounted to an output shaft and meshing with the third
      gear, the fourth gear selectively engaging of the output shaft by mechanical
      engagement to rotate together with the output shaft; and
   the coupler shaft operatively connected to the first shaft to cause the first shaft to rotate when the
   coupler shaft rotates.

2. The drive combination of claim 1 wherein the torque converter to driveline coupler also comprises a driveline brake that selectively engages the coupler shaft to prevent the coupler shaft from rotating.

3. The drive combination of claim 2 wherein the torque converter to driveline coupler includes a housing within which the coupler shaft is mounted to rotate and the driveline brake comprises
   a drum rotationally fixed to the coupler shaft to rotate with the coupler shaft, a resilient brake band that closely surrounds the brake drum and that is mounted to the housing, and an actuator that engages the brake band to selectively cause the brake band to contact around the brake drum to prevent the brake drum from rotating in the housing.

4. The drive combination of claim 1 wherein the coupler shaft is operatively connected to the first shaft by comprising a single continuous shaft.

5. The drive combination of claim 1 wherein the fourth gear selectively engages the output shaft by a positive engagement jaw clutch.

6. The drive combination of claim 2 wherein the coupler shaft is operatively connected to the first shaft by comprising a single continuous shaft.

7. The drive combination of claim 2 wherein the fourth gear selectively engages the output shaft by a positive engagement jaw clutch.

* * * * *